United States Patent
Delano et al.

(10) Patent No.: US 11,190,100 B2
(45) Date of Patent: Nov. 30, 2021

(54) CHARGING DEVICE

(71) Applicant: Maxim Integrated Products, Inc., San Jose, CA (US)

(72) Inventors: Cary Delano, Los Altos, CA (US); Gaurav Mital, Fremont, CA (US); Taichi Hoshino, Tokyo (JP)

(73) Assignee: Maxim Integrated Products, Inc., San Jose, CA (US)

( * ) Notice: Subject to any disclaimer, the term of this patent is extended or adjusted under 35 U.S.C. 154(b) by 360 days.

(21) Appl. No.: 16/415,358

(22) Filed: May 17, 2019

(65) Prior Publication Data

US 2020/0021190 A1 Jan. 16, 2020

Related U.S. Application Data

(60) Provisional application No. 62/696,404, filed on Jul. 11, 2018.

(51) Int. Cl.
*H02M 3/158* (2006.01)
*H02M 1/00* (2006.01)
*H02J 7/00* (2006.01)

(52) U.S. Cl.
CPC ............. *H02M 3/158* (2013.01); *H02J 7/00* (2013.01); *H02M 1/00* (2013.01); *H02J 2207/20* (2020.01); *H02M 1/009* (2021.05)

(58) Field of Classification Search
CPC ........ H02M 3/158; H02M 1/00; H02M 1/009; H02J 7/00; H02J 2207/20
USPC ........................................................ 320/140
See application file for complete search history.

(56) References Cited

U.S. PATENT DOCUMENTS

| | | |
|---|---|---|
| 6,320,354 B1 | 11/2001 | Sengupta et al. |
| 7,256,568 B2 | 8/2007 | Lam et al. |
| 9,225,245 B2 | 12/2015 | Miyamae |
| 9,628,033 B2 | 4/2017 | King et al. |
| 9,634,566 B2 | 4/2017 | King et al. |
| 9,654,056 B2 | 5/2017 | Amadi et al. |
| 9,698,732 B2 | 7/2017 | Maru et al. |

(Continued)

FOREIGN PATENT DOCUMENTS

DE 102006034804 A1 1/2008

OTHER PUBLICATIONS

First Office Action dated Dec. 21, 2020 from German Patent Office for German Patent Application No. 102019118678.1; 5 pages.

(Continued)

*Primary Examiner* — Suresh Memula

(57) ABSTRACT

A charger device comprises a Single-Input-Multiple-Output (SIMO) device including a first transistor connected to an input and a first end of an inductor, a second transistor connected to ground and the first end of the inductor, a third transistor connected to a second end of the inductor and a first output, a fourth transistor connected to the second end of the inductor and a second output, and a controller connected to the SIMO device. The controller is configured to cause the SIMO device to charge the inductor based upon an input signal using a first power source coupled to the input during a first time period and discharge the inductor to charge at least one of the first power source and a second power source coupled to the first output during an unused time period.

20 Claims, 10 Drawing Sheets

(56) References Cited

U.S. PATENT DOCUMENTS

| | | |
|---|---|---|
| 10,170,990 B2 | 1/2019 | Calhoun et al. |
| 10,622,900 B1* | 4/2020 | Wei ............... H02M 3/1582 |
| 2005/0264271 A1 | 12/2005 | Lam et al. |
| 2012/0242309 A1* | 9/2012 | Korzeniowski ....... H02M 3/158 |
| | | 323/282 |
| 2013/0154587 A1* | 6/2013 | Gilliom ................ H02M 3/158 |
| | | 323/267 |
| 2013/0154588 A1* | 6/2013 | Gilliom ............ H02M 3/33561 |
| | | 323/267 |
| 2016/0308445 A1 | 10/2016 | King et al. |
| 2017/0040895 A1 | 2/2017 | May et al. |
| 2017/0141603 A1 | 5/2017 | King et al. |
| 2017/0141675 A1 | 5/2017 | King et al. |
| 2017/0179895 A1 | 6/2017 | King et al. |
| 2017/0207755 A1 | 7/2017 | He et al. |
| 2017/0207759 A1 | 7/2017 | He et al. |
| 2017/0366086 A1* | 12/2017 | Calhoun ............... H02M 3/158 |
| 2018/0076635 A1 | 3/2018 | Maalouf et al. |
| 2018/0092179 A1* | 3/2018 | Guo ...................... H05B 45/46 |
| 2018/0129234 A1 | 5/2018 | Melgar et al. |
| 2019/0267897 A1* | 8/2019 | Hsieh .................... H02M 1/36 |
| 2020/0091836 A1* | 3/2020 | Lee ..................... H02M 7/4826 |
| 2020/0244167 A1* | 7/2020 | Delano ................. H02M 3/158 |

OTHER PUBLICATIONS

First Office Action dated Dec. 21, 2020 from German Patent Office for German Patent Application No. 102019118678.1; 3 pages. (Machine Translation).

* cited by examiner

CHARGING DEVICE

CROSS-REFERENCE TO RELATED APPLICATIONS

This application claims the benefit of U.S. Provisional Application No. 62/696,404, filed on Jul. 11, 2018. The entire disclosure of the application referenced above is incorporated herein by reference.

FIELD

The present disclosure relates to charging devices, and more particularly to Single-Input-Multiple-Output (SIMO) devices and Multiple-Input-Multiple-Output (MIMO) power converter devices that are configured to power a power source.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Typically, battery powered consumer devices require more than one power supply voltage level to operate. For example, a processor may operate at a first voltage level while one or more peripherals may operate at a second voltage level. As a result, these devices incorporate power converters to convert electric energy from one form to another. For example, power converters may be used to convert a direct current (DC) or a rectified alternating current (AC) input signal to one or more DC output signals at the same or different power levels. Power converters can include Single-Input-Multiple-Output (SIMO) devices and Multiple-Input-Multiple-Output (MIMO) devices that store current in a single inductor based on an input signal and selectively discharge the stored current to multiple loads connected to selected outputs of the SIMO device.

SUMMARY

A charger device comprises a Single-Input-Multiple-Output (SIMO) device including a first transistor connected to an input and a first end of an inductor, a second transistor connected to ground and the first end of the inductor, a third transistor connected to a second end of the inductor and a first output, a fourth transistor connected to the second end of the inductor and a second output, and a controller connected to the SIMO device. The controller is configured to cause the SIMO device to charge the inductor based upon an input signal using a first power source coupled to the input during a first time period and discharge the inductor to charge at least one of the first power source and a second power source coupled to the first output during an unused time period.

In other features, the first power source comprises a battery.

In other features, the charger device includes a first comparator configured to compare an input signal received from the first output to a first voltage reference signal and to generate a first comparison signal based upon the comparison and a second comparator configured to compare an input signal received from the second output to a second reference voltage signal and generate a second comparison signal based upon the comparison.

In other features, the controller is further configured to cause the SIMO device to selectively discharge the inductor to power the second power source based upon the first comparison signal.

In other features, the charger device further includes a charger having a first end connected to the first output and a second end connected to the second power source.

In other features, the charger device further includes a headroom tracker having a first end connected to the first end of the charger and a second end connected to the second end of the charger. The headroom tracker is configured to generate an enable signal having a first state when a voltage difference between the first end of the charger and the second end of the charger is greater than a predetermined threshold voltage and having a second state when the voltage difference between the first end of the charger and the second end of the charger is less than the predetermined threshold voltage.

In other features, the controller is configured to adjust a voltage at the first output in response to the enable signal having the first state.

A charger device comprises a Single-Input-Multiple-Output (SIMO) device including a first transistor connected to an input and a first end of an inductor, a second transistor connected to ground and the first end of the inductor, a third transistor connected to a second end of the inductor and a first output, and a fourth transistor connected to the second end of the inductor and a second output. The charger device also comprises a charger having a first end connected to the first output and a second end and a controller that is operatively connected to the SIMO device and configured to cause the SIMO device to power the inductor based upon an input signal provided by a first power source and discharge the inductor to power at least one of the first power source and a second power source via the charger during an unused time period.

In other features, the first power source comprises a battery.

In other features, the charger device includes a first comparator configured to compare an input signal received from the first output to a first voltage reference signal and generate a first comparison signal based upon the comparison and a second comparator configured to compare an input signal received from the second output to a second reference signal and generate a comparison second signal based upon the comparison.

In other features, the controller is configured to cause the SIMO to selectively discharge the inductor to power the second power source based upon the first comparison signal.

In other features, the charger device includes a headroom tracker having a first end connected to the first end of the charger and a second end connected to the second end of the charger. The headroom tracker is configured to generate an enable signal having a first state when a voltage difference between the first end of the charger and the second end of the charger is greater than a predetermined threshold voltage and having a second state when the voltage difference between the first end of the charger and the second end of the charger is less than the predetermined threshold voltage.

In other features, the controller is further configured to adjust a voltage at the first output in response to the enable signal having the first state.

In other features, the charger comprises a linear charger.

A charger device comprises a Multiple-Input-Multiple-Output (MIMO) device including a first transistor connected to a first input and a first end of an inductor, a second transistor connected to a second input and the first end of the inductor, a third transistor connected to ground and the first end of the inductor, a fourth transistor connected to a second end of the inductor and a first output, and a fifth transistor connected to the second end of the inductor and a second output. The charger device also includes a controller that is operatively connected to the MIMO device and configured to cause the MIMO device (1) to charge the inductor based upon at least one of a first input signal provided by a first power source connected to the first input and a second input signal provided by a second power source connected to the second input and (2) to discharge the inductor to charge at least one of the first power source and a third power source coupled to the first output during an unused time period.

In other features, the charger device includes the first power source and the second power source.

In other features, the charger device includes a first comparator configured to compare an input signal received from the first output to a first voltage reference signal and generate a first comparison signal based upon the comparison and a second comparator configured to compare an input signal received from the second output to a second reference voltage signal and generate a comparison signal based upon the comparison.

In other features, the controller is further configured to cause the MIMO to selectively discharge the inductor to power the third power source based upon the first comparison signal.

In other features, the charger device includes a charger having a first end connected to the first output and a second end connected to the second power source and a headroom tracker having a first end connected to the first end of the charger and a second end connected to the second end of the charger. The headroom tracker is configured to generate a headroom tracker signal when a voltage difference between the first end of the charger and the second end of the charger is greater than a predetermined threshold voltage.

In other features, the controller is further configured to adjust a voltage at the first output in response to the headroom tracker signal.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Single-Input-Multiple-Output (SIMO) devices and Multiple-Input-Multiple-Output (MIMO) devices (also referred to as Multiple-Inductor-Multiple-Output) utilize a single inductor to store energy and to power multiple electrical loads. The inductor is charged (energy stored) during a first time period and delivers the energy to an electrical load connected to one of multiple outputs of the SIMO or MIMO device during a second time period.

The present disclosure is directed to a SIMO device and/or a MIMO device that can supply current to a power source, such as a battery, or a connector, such as a universal serial bus (USB) during unused time periods. Unused time periods may refer to time periods in which other electrical loads do not require power and/or the inductor does not require charging.

The SIMO device includes a first transistor connected to an input and a first end of an inductor, a second transistor connected to ground and the first end of the inductor, a third transistor connected to a second end of the inductor and a first output, a fourth transistor, optionally, connected to the second end of the inductor and the ground, and a fifth transistor connected to the second end of the inductor and a second output. Additional transistors can be connected to the second terminal of the inductor and additional outputs. The charger device also includes a controller that is connected to the SIMO device and configured to cause the SIMO device to selectively charge a power source coupled to the first output during unused time periods.

Figure 1:
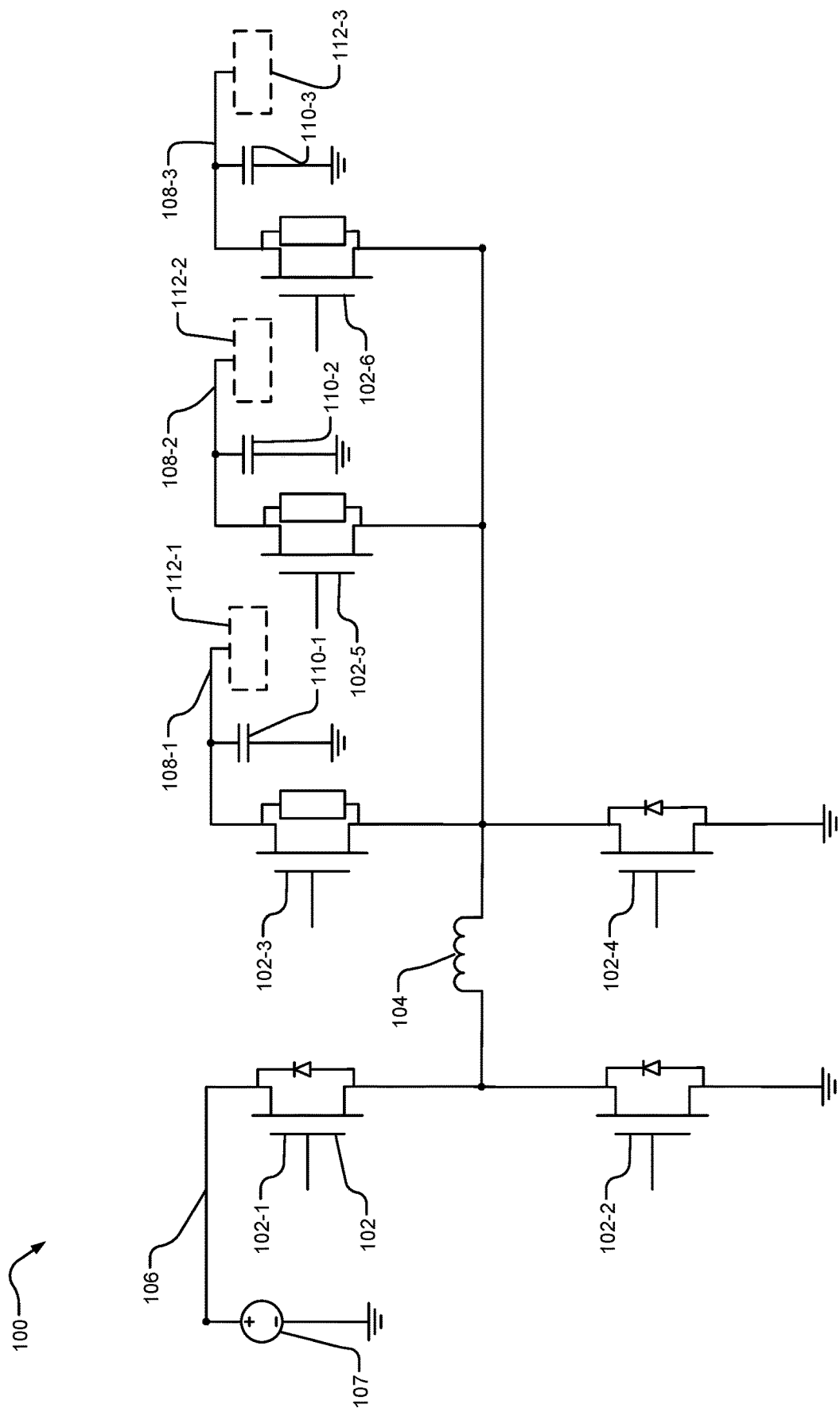
FIG. 1 is a schematic diagram illustrating an example Single-Input-Multiple-Output (SIMO) device in accordance with an example implementation of the present disclosure.

FIG. 1 illustrates an example schematic diagram of a SIMO device 100 in accordance with the present disclosure. The SIMO device 100 includes multiple transistors 102 and an inductor 104. In implementations, the transistors 102 include metal-oxide-semiconductor field-effect transistors (MOSFETs). As shown, the SIMO device 100 includes a first transistor 102-1, a second transistor 102-2, a third transistor 102-3, optionally, a fourth transistor 102-4, a fifth transistor 102-5, and a sixth transistor 102-6. However, it is understood that the SIMO device 100 can include a varying number of transistors to provide additional or fewer outputs based upon the configuration of the SIMO. For example, the fourth transistor 102-4 may not be used in SIMO devices 100 operating in buck-only mode.

The SIMO device 100 receives control signals at the gates of the transistors 102-1 through 102-6 to control charging and discharging of the inductor 104. For example, in buck-boost mode, based upon the control signals, energy is transferred to the inductor 104 using the first transistor 102-1 and the fourth transistor 102-4, and energy is transferred from the inductor 104 using the second transistor 102-2 and one of the third transistor 102-3, the fifth transistor 102-5, or the sixth transistor 102-6 to provide current to a selected output 108-1, 108-2, 108-3 that charges a corresponding capacitor 110-1, 110-2, 110-3. As shown, the first transistor 102-1 is connected to an input 106 to receive an input signal from a power source 107.

The third transistor 102-3, the fifth transistor 102-5, and the sixth transistor 102-6 are connected to outputs 108-1, 108-2, 108-3, respectively. In some examples, each output 108-1, 108-2, 108-3 is connected to a respective capacitor 110-1, 110-2, 110-3. The capacitors 110-1, 110-2, 110-3 are charged to a desired voltage level by the inductor 104 based upon the control signals. The capacitors 110-1, 110-2, 110-3 can power one or more electronic loads 112-1, 112-2, 112-3, which are connected to the respective capacitors 110-1, 110-2, 110-3.

Figure 2:
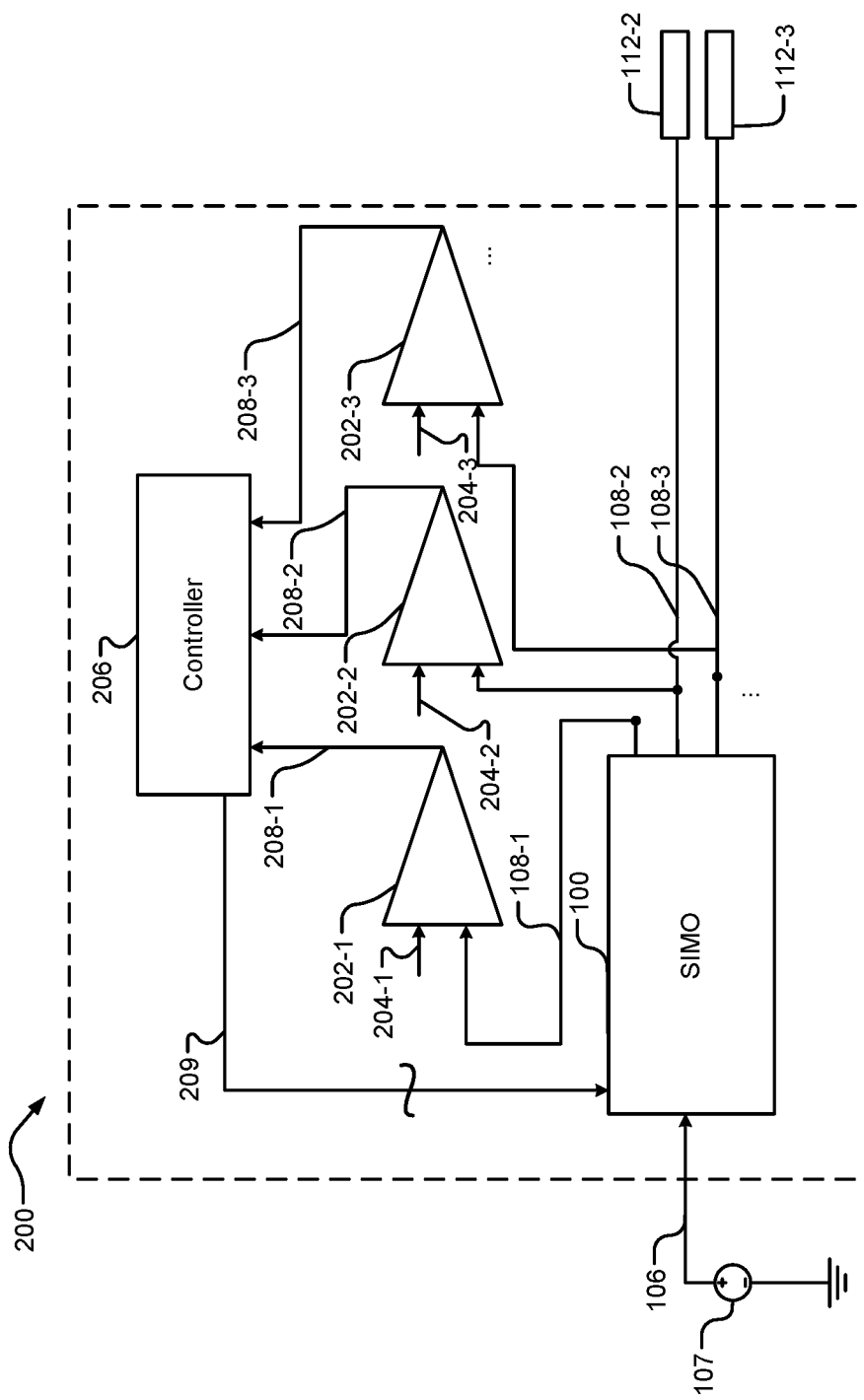
FIG. 2 is a schematic diagram illustrating an example SIMO control device in accordance with an example implementation of the present disclosure.

FIG. 2 illustrates an example SIMO control device 200 in accordance with an example implementation of the present disclosure. As shown, the SIMO control device 200 includes the SIMO device 100. The SIMO control device 200 also includes comparators 202-1, 202-2, 202-3 that are connected to the corresponding outputs 108-1, 108-2, 108-3. The comparators 202-1, 202-2, 202-3 receive a first input signal corresponding to the voltage of the respective capacitors 110-1, 110-2, 110-3 and a reference voltage signal at respective inputs 204-1, 204-2, 204-3. The comparators 202-1, 202-2, 202-3 output comparison signals based upon the comparison of the first input signal to the reference voltage signal. The reference voltage signals can be the same or different. The comparison signal is indicative of whether the corresponding capacitor 110-1, 110-2, 110-3 requires charging.

The comparators 202-1, 202-2, 202-3 output the comparison signal to a controller 206 via corresponding outputs 208-1, 208-2, 208-3. Based upon the comparison signal, the controller 206 controls operation of the SIMO device 100, as well as the MIMO device described below. For example, the controller 206 can selectively control output signals to corresponding gates of the transistors 102 to control charging or discharging of the inductor 104 and/or the capacitors 110-1, 110-2, 110-3 based upon the comparison signals via output 209. As shown in FIG. 2, the output 209 includes multiple signal lines, and each signal line can be connected to a respective transistor 102 gate.

In various implementations, the controller 206 may include a First-Input First-Output (FIFO) device that prioritizes charging of the capacitors 110-1, 110-2, 110-3 according to the received comparison signals. In these implementations, the controller 206 provides control signals that selectively cause the SIMO device 100 to power the capacitors 110-1, 110-2, 110-3 based upon the received comparison signals. For example, if the voltage stored by one or more of the capacitors 110-1, 110-2, 110-3 is less than the corresponding reference signal, the controller 206 outputs a control signal to cause the inductor 104 to add energy to a capacitor 110-1, 110-2, 110-3 during a first time period and to cause the inductor 104 to add energy to another capacitor 110-1, 110-2, 110-3 during another time period.

Figure 3A:
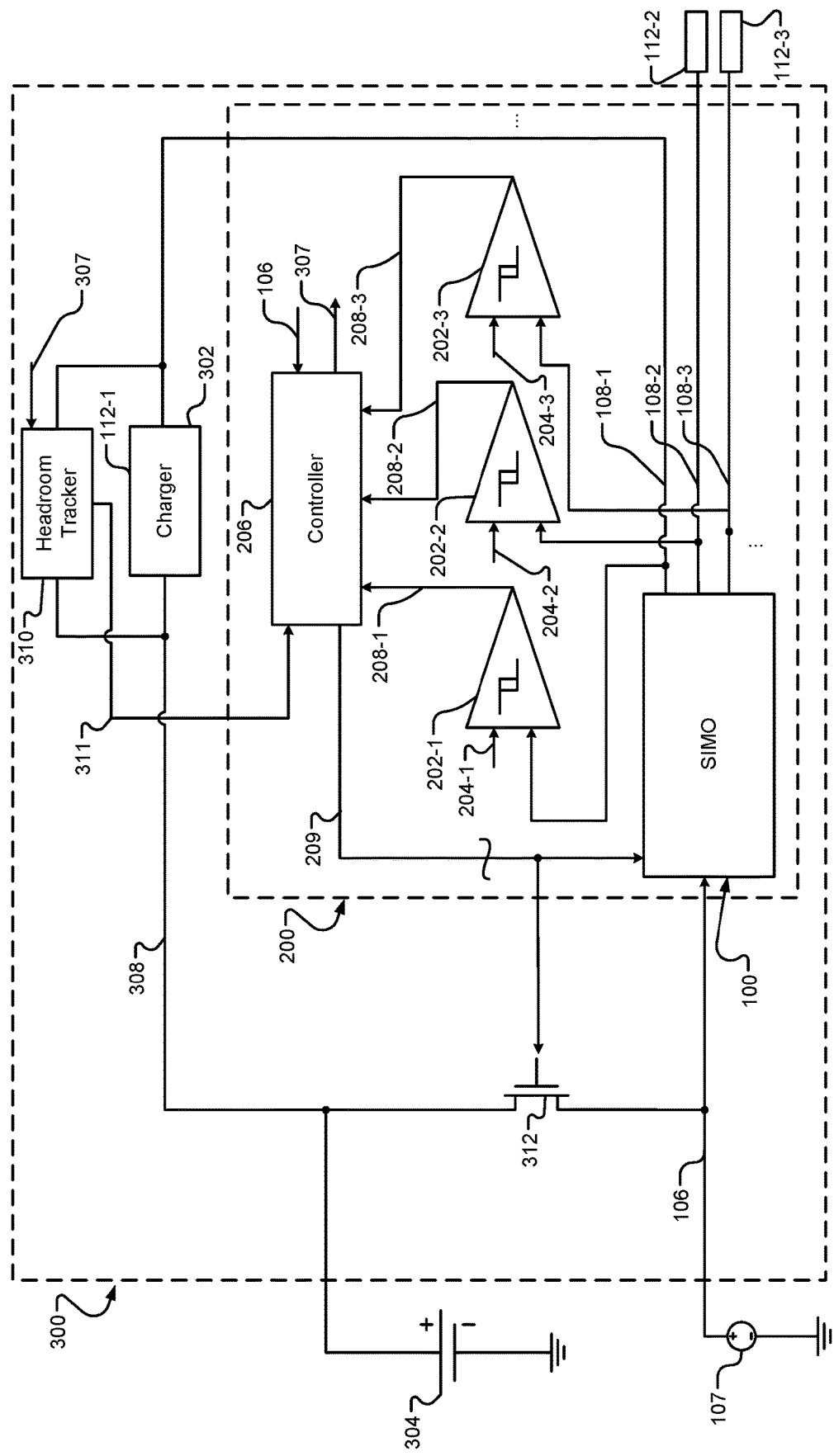
FIG. 3A is a schematic diagram illustrating an example SIMO charger device in accordance with an example implementation of the present disclosure.

FIG. 3A illustrates an example SIMO charger device 300. The SIMO charger device 300 includes the SIMO device 100 and the SIMO control device 200. The SIMO charger device 300 includes a charger 302 that can charge a power source 304. The charger 302 is connected to at least one of the respective outputs 108-1, 108-2, 108-3. While it is shown that output 108-1 is connected to the charger 302, it is understood that output 108-2 or output 108-3 can be connected to the charger 302. In implementations, the charger 302 comprises a linear charger, and the power source 304 may be a battery.

As described above, the controller 206 controls the voltage of the capacitors 110-1, 110-2, 110-3 according to the comparison signals. In an example implementation of the present disclosure, the controller 206 can cause the SIMO device 100 to discharge energy stored in the inductor 104 to charge the capacitor 110-1, and the capacitor 110-1 provides power to the charger 302 during unused time periods. The charger 302 can then provide power to the power source 304 via an output 308. In some implementations, the charger 302 regulates the energy provided to the power source 304.

The SIMO charger device 300 also includes a headroom tracker 310. As shown, the headroom tracker 310 can be connected in parallel with the charger 302. For example, the headroom tracker 310 is connected between the output 108-1 and the output 308. The headroom tracker 310 monitors a voltage difference between the output 108-1 and the output 308 and determines whether the voltage difference is greater than a predetermined threshold. A signal representing the predetermined threshold may be provided by the controller 206 via output 307. The headroom tracker 310 transmits an enable signal having a first state to the controller 206 via an output 311 when the voltage difference is greater than the predetermined threshold. When the voltage difference is less than the predetermined threshold, the controller 206 outputs an enable signal having a second state indicative of the comparison. In response, the controller 206 adjusts the SIMO output connected to the charger in order to control the headroom across the charger (e.g., output 108-1 in FIG. 3A). By minimizing the voltage across the charger, the dissipation of the charger is reduced.

Figure 3B:
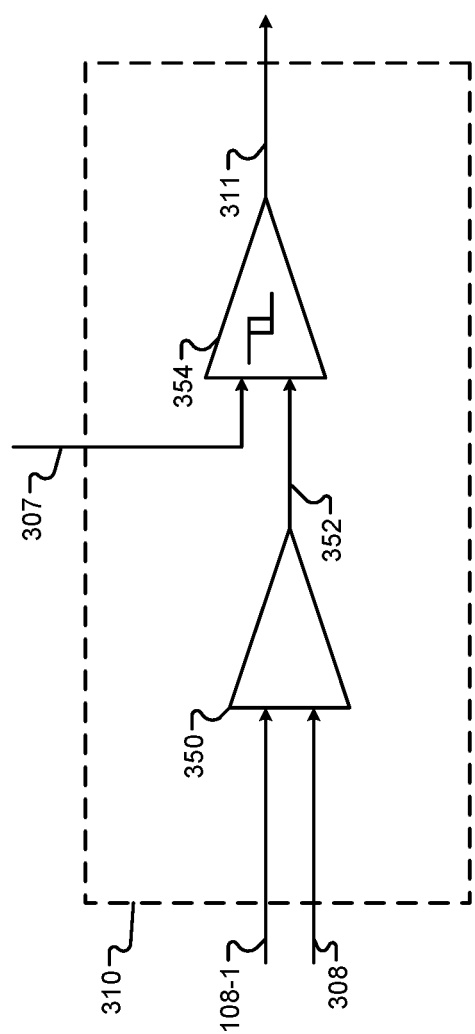
FIG. 3B is a schematic diagram illustrating an example headroom tracker in accordance with an example implementation of the present disclosure.

FIG. 3B illustrates an example implementation, the headroom tracker 310 may comprise a differential amplifier 350 that receives signals from the SIMO output 108-1 and the charger output 308 as input. The differential amplifier 350 outputs a difference signal representing the difference between the input signals at output 352 to a comparator 354. The comparator 354 compares the difference signal with the predetermined threshold signal (e.g., output 307) and outputs the enable signal via output 311 indicative of the comparison.

The controller 206 causes the SIMO device 100 to adjust the voltage stored at the capacitor 110-1 based upon the headroom control signal to maintain minimum dissipation at the charger 302 at a predetermined dissipation threshold. The controller 206 may adjust the voltage at the capacitor 110-1 to be approximately the desired voltage of the power source 304 plus a predetermined offset voltage.

The SIMO charger device 300 also includes a switch 312 controlled by the controller 206. For example, the controller 206 selectively operates the switch 312 to connect the power source 304 to the SIMO device 100 or disconnect the power source 304 from the SIMO device 100. The controller 206 can cause the switch 312 to be in a closed state to electrically connect the power source 304 to the SIMO device 100 such that the power source 304 powers to the SIMO device 100. In one or more implementations, the switch 312 comprises a MOSFET transistor.

Figure 4:
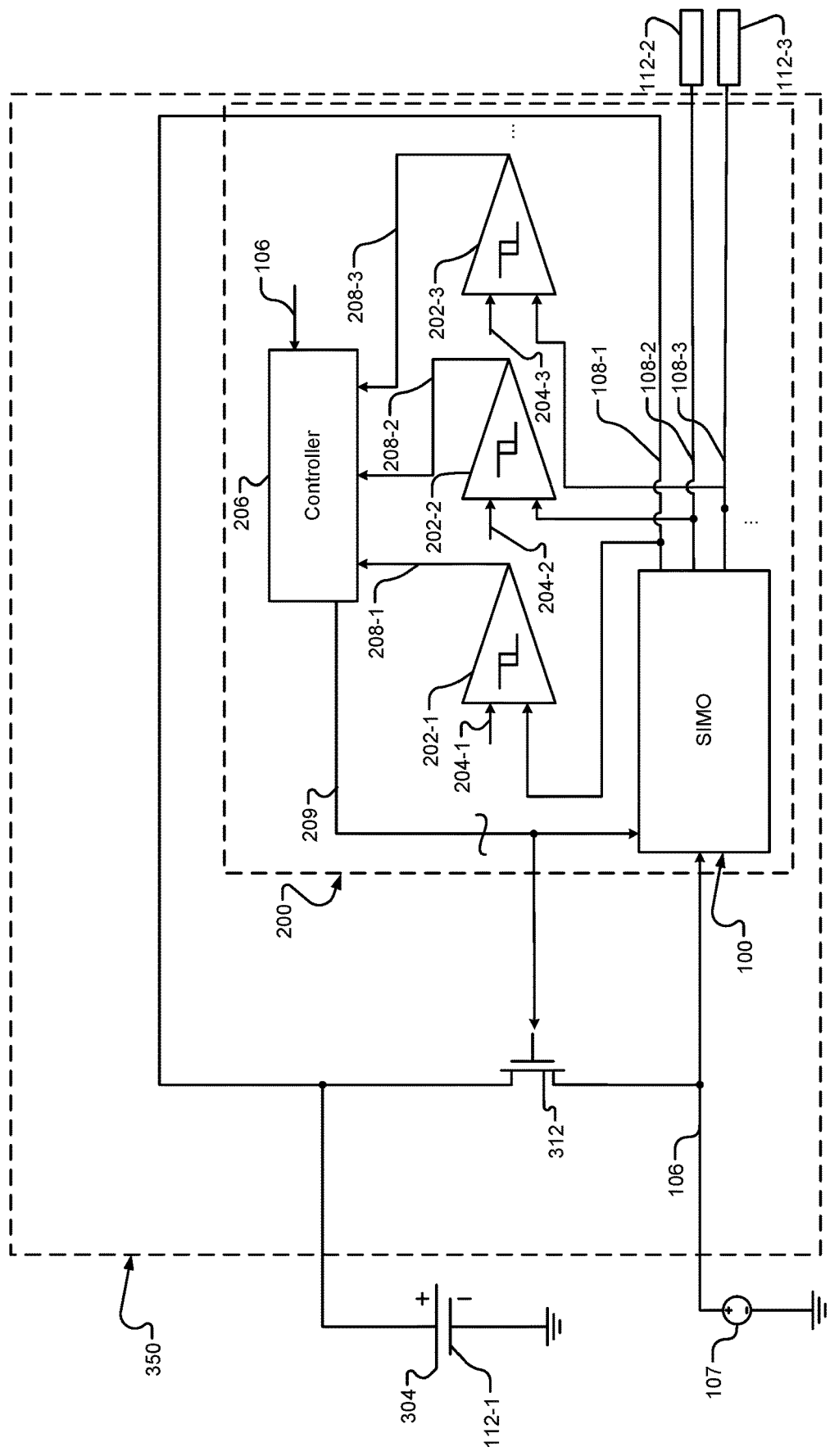
FIG. 4 is a schematic diagram illustrating another example SIMO charger device in accordance with an example implementation of the present disclosure.

FIG. 4 illustrates another implementation of a SIMO charger device 350. In this implementation, the SIMO charger device 350 includes the SIMO device 100 and the SIMO control device 200. As shown in FIG. 4, the output 108-1 of the SIMO device 100 is directly connected to the power source 304. During operation, the SIMO control device 200 can cause the SIMO device 100 to charge the power source 304 based upon the comparison signal provided by the comparator 202-1. In this implementation, the comparison signal provided by the comparator 202-1 may be indicative of a voltage at the power source 304. In another implementation, a sense device may monitor the current going through power source 304 via output 108-1 and the controller 206 adjusts the current to match a predetermined target value. In various implementations, the sense device may be transistor in the SIMO 100 or a sense resistor.

Figure 5:
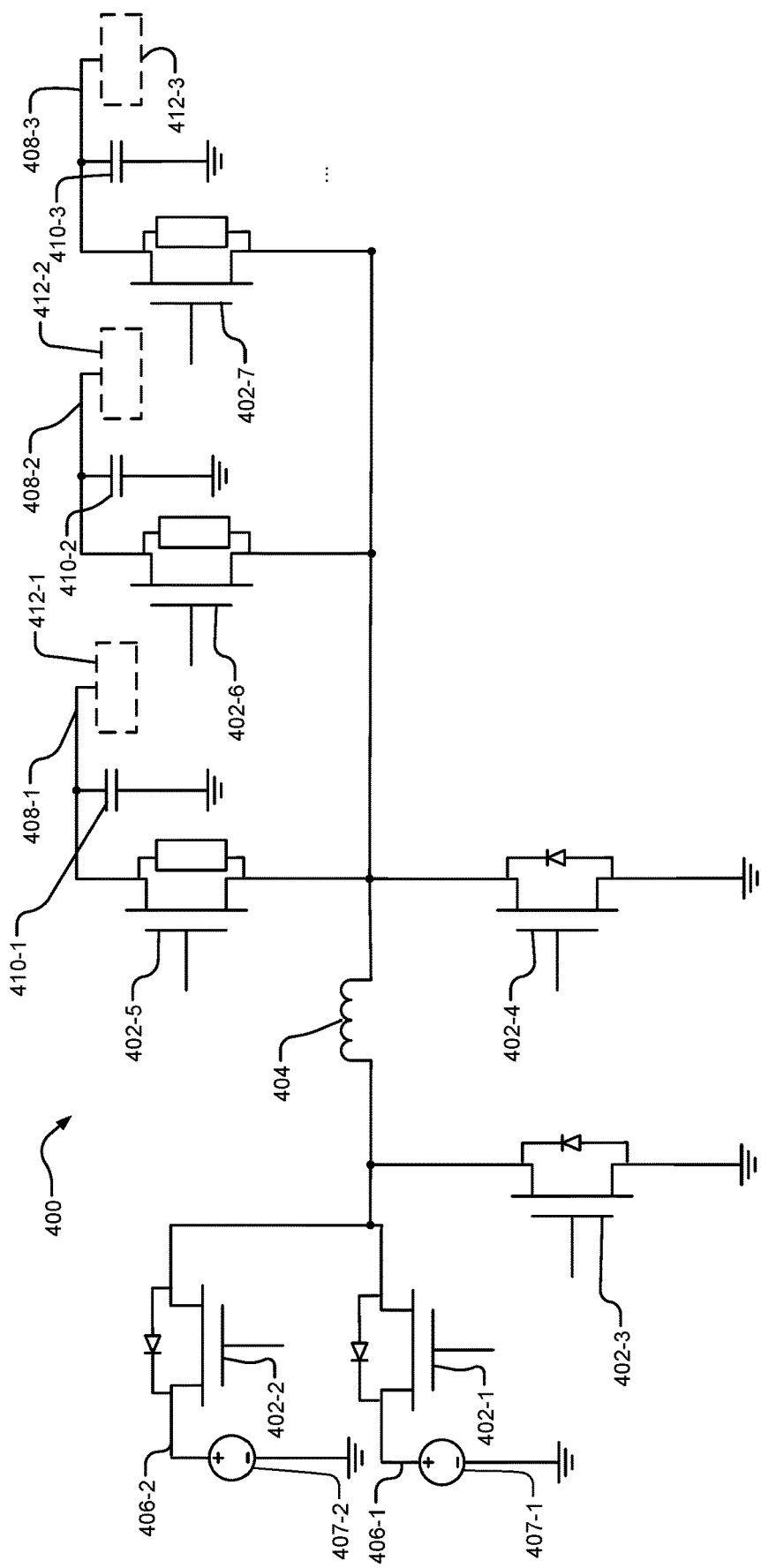
FIG. 5 is a schematic diagram illustrating an example Multiple-Input-Multiple-Output (MIMO) device in accordance with an example implementation of the present disclosure.

FIG. 5 illustrates an example MIMO device 400. As shown, the MIMO device 400 includes transistors 402-1, 402-2, 402-3, 402-4 (optionally), 402-5, 402-6, 402-7 and an inductor 404. In various implementations, the transistor 402-4 is not needed when using the MIMO device 400 in buck only mode. The transistors 402-1, 402-2 are connected to inputs 406-1, 406-2 and can each receive a corresponding input signal. For example, the input 406-1 is connected to a power source 407-1, and the input 406-2 is connected to a power source 407-2. In an implementation, the power sources 407-1, 407-2 can be different power sources.

The transistors 402-5, 402-6, 402-7 are connected to outputs 408-1, 408-2, 408-3 to selectively provide an output signal based upon the stored energy in the inductor 404. The MIMO device 400 includes capacitors 410-1, 410-2, 410-3 that are connected to respective outputs 408-1, 408-2, 408-3. The capacitors 410-1, 410-2, 410-3 store energy to power the respective electrical loads 412-1, 412-2, 412-3.

Energy is transferred to the inductor 404 using at least one of the transistors 402-1, 402-2 and the transistor 402-4, and energy is transferred from the inductor 404 using the transistor 402-3 and at least one of transistor 402-5, 402-6, 402-7. For example, current is provided to a corresponding capacitor 410-1, 410-2, 410-3 to charge that capacitor 410-1, 410-2, 410-3 to a desired voltage level. Transistors 402-1, 402-2 can be controlled at a predetermined frequency or controlled on a cycle-by-cycle basis. The current through 402-1 and/or 402-2 can be controlled by selecting which of 402-1 and/or 402-2 is to be selected.

Figure 6:
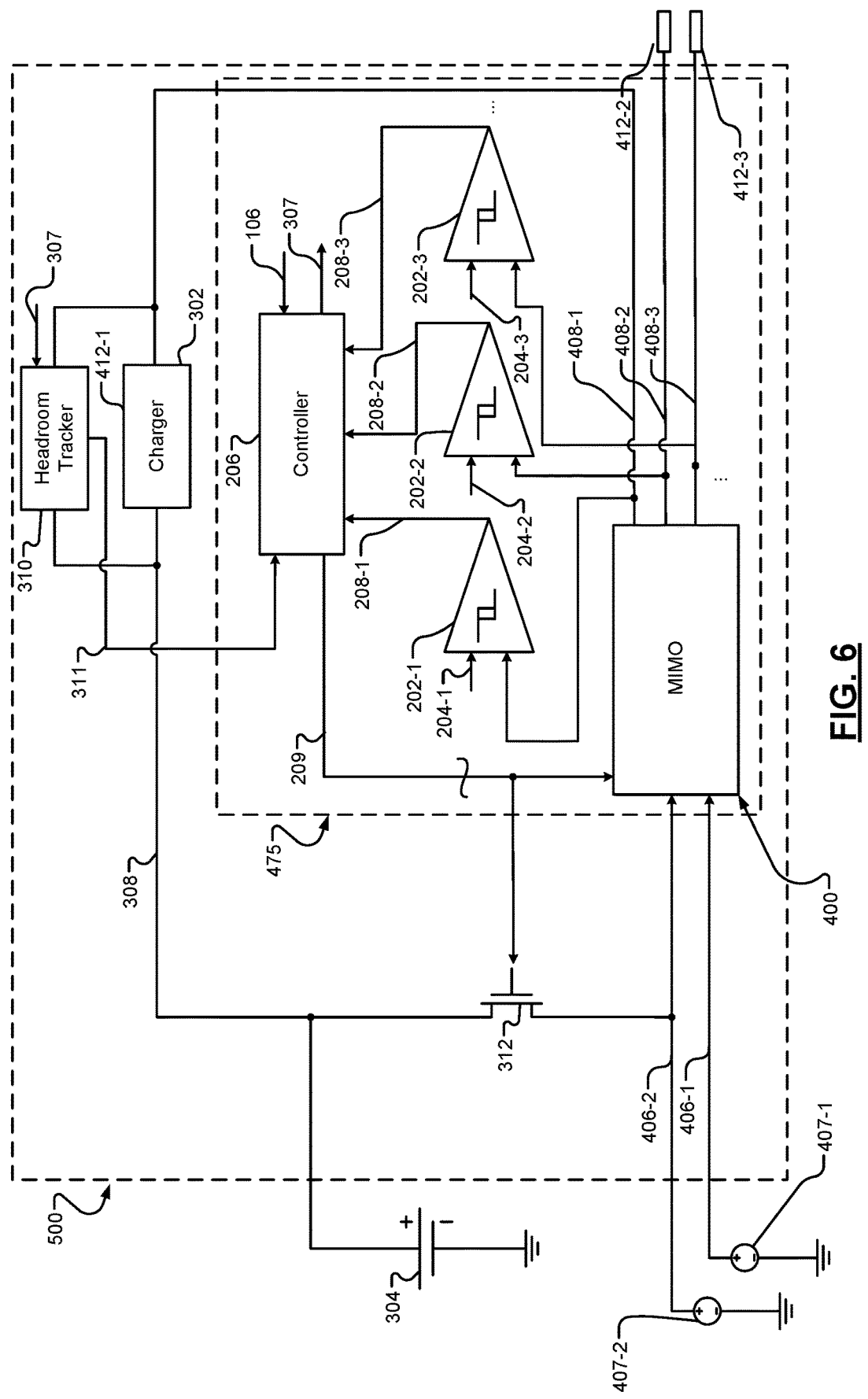
FIG. 6 is a schematic diagram illustrating an example MIMO charger device in accordance with an example implementation of the present disclosure.
Figure 7:
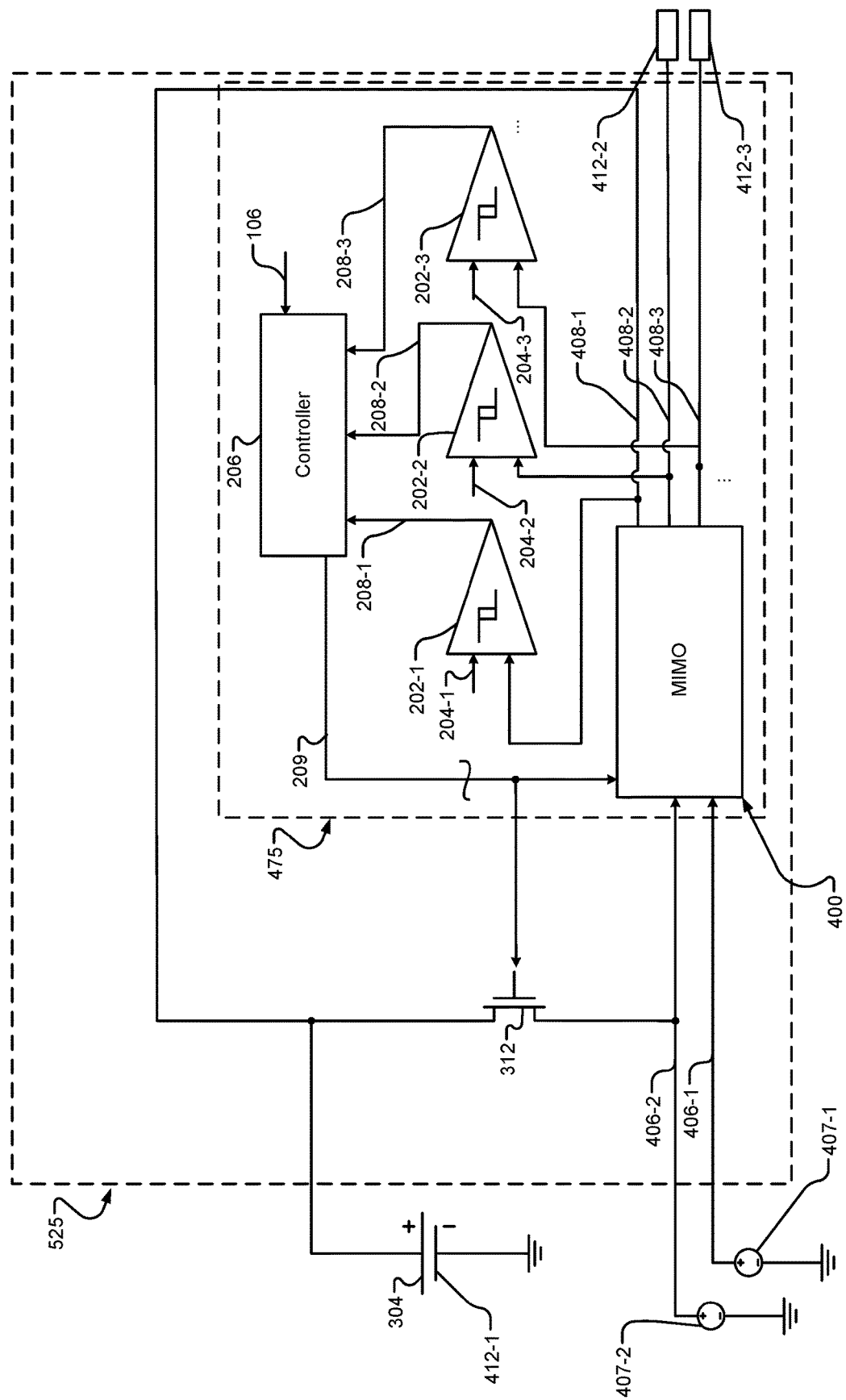
FIG. 7 is a schematic diagram illustrating another example MIMO charger device in accordance with an example implementation of the present disclosure.

FIGS. 6 and 7 illustrate example MIMO charger devices 500, 525 that include the MIMO device 400. The MIMO charger devices 500, 550 each include a MIMO device 400 and a MIMO control device 475. The MIMO control device 475 operates similar to the SIMO control device 200 described above. As shown in FIG. 6, the MIMO charger device 500 includes a charger 302 and a headroom tracker 310. Similar to the SIMO charger device 300 described above, the charger 302 is configured to charge the power source 304 during unused time periods. As shown in FIG. 7, the output 408-1 of the MIMO charger device 550 is directly connected to the power source 304 such that the MIMO device 400 powers the power source 304 during unused time periods.

Figure 8:
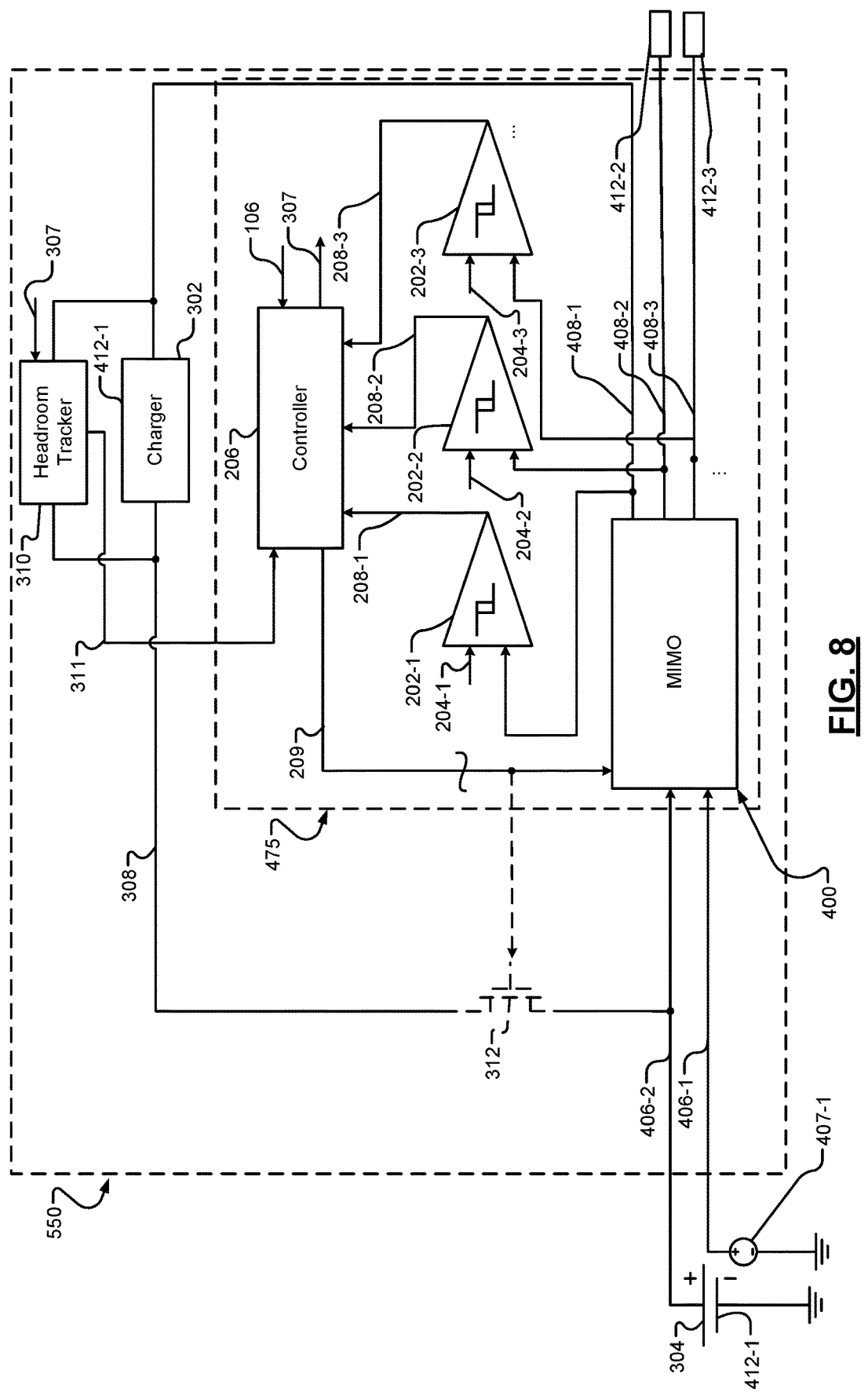
FIG. 8 is a schematic diagram illustrating another example MIMO charger device in accordance with an example implementation of the present disclosure.
Figure 9:
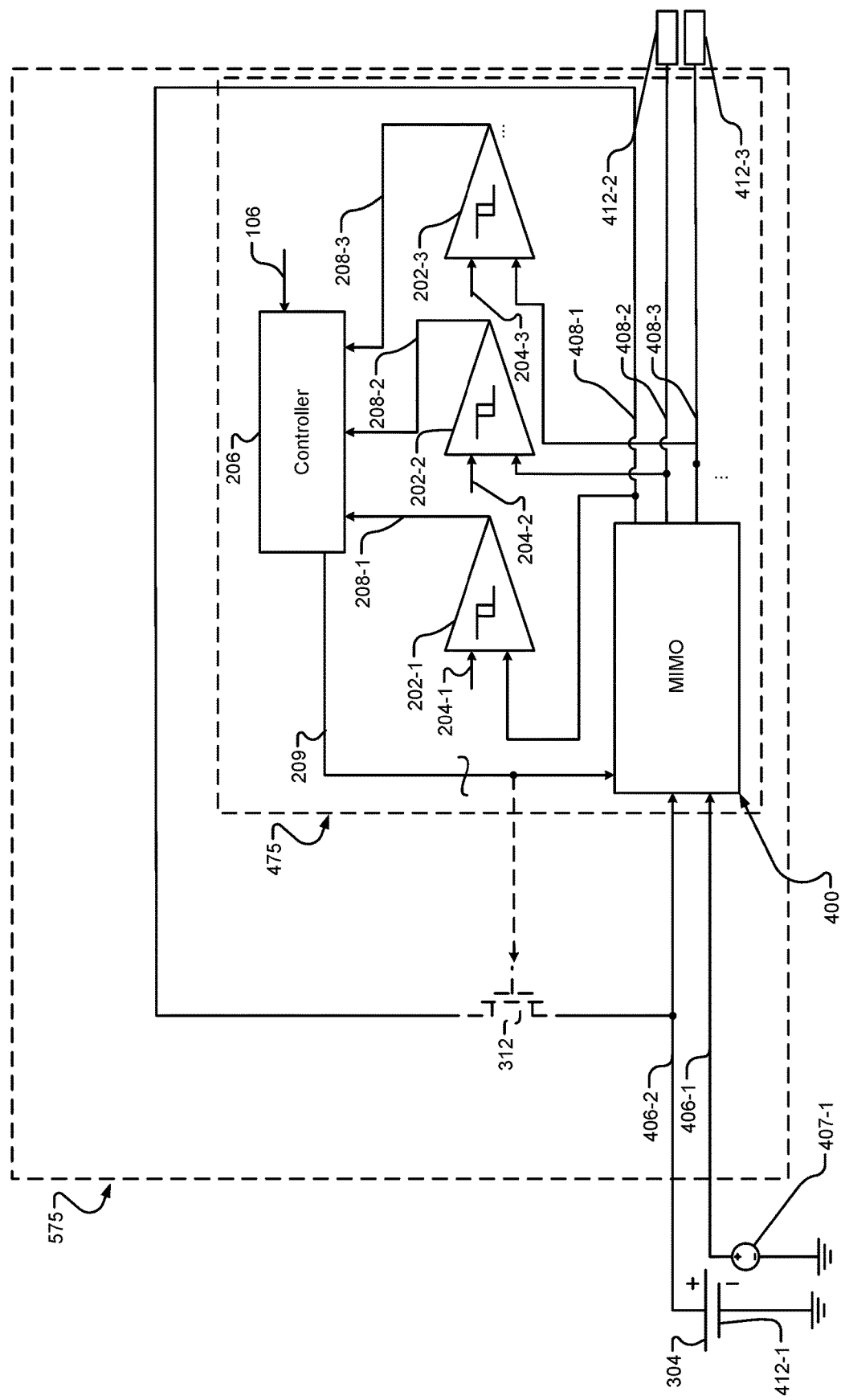
FIG. 9 is a schematic diagram illustrating another example MIMO charger device in accordance with an example implementation of the present disclosure.

FIGS. 8 and 9 illustrate example MIMO charger devices 550, 575 that include the MIMO device 400 in which the power source 304 comprises one of the inputs to the MIMO device 400. The MIMO charger devices 500, 550 each include a MIMO device 400 and a MIMO control device 475. The MIMO control device 475 operates similar to the SIMO control device 200 described above. As shown in FIG. 8, the MIMO charger device 500 includes a charger 302 and a headroom tracker 310. Similar to the SIMO charger device 300 described above, the charger 302 is configured to charge the power source 304 during unused time periods. The switch 312 may be included in some implementations and not included in other implementations.

The SIMO and/or MIMO devices described herein can be designed to operate in discontinuous conduction mode (DCM), continuous conduction mode (CCM) mode, buck mode, boost mode, buck-boost mode, or any combination thereof without deviating from the spirit of the disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A charger device comprising:
   a Single-Input-Multiple-Output (SIMO) device including:
      a first transistor connected to an input and a first end of an inductor;
      a second transistor connected to ground and the first end of the inductor;
      a third transistor connected to a second end of the inductor and a first output;
      a fourth transistor connected to the second end of the inductor and a second output; and
   a controller connected to the SIMO device and configured to cause the SIMO device to charge the inductor based upon an input signal using a first power source coupled to the input during a first time period and discharge the inductor to charge at least one of the first power source and a second power source coupled to the first output during an unused time period,
   wherein the second power source is connected to the input.

2. The charger device as recited in claim 1, wherein the first power source comprises a battery.

3. The charger device as recited in claim 1, further comprising:
   a first comparator configured to compare an input signal received from the first output to a first voltage reference signal and to generate a first comparison signal based upon the comparison; and
   a second comparator configured to compare an input signal received from the second output to a second reference voltage signal and generate a second comparison signal based upon the comparison.

4. The charger device as recited in claim 3, wherein the controller is further configured to cause the SIMO device to selectively discharge the inductor to power the second power source based upon the first comparison signal.

5. The charger device as recited in claim 3, further comprising a charger having a first end connected to the first output and a second end connected to the second power source.

6. The charger device as recited in claim 5, further comprising a headroom tracker having a first end connected to the first end of the charger and a second end connected to the second end of the charger, the headroom tracker configured to generate an enable signal having a first state when a voltage difference between the first end of the charger and the second end of the charger is greater than a predetermined threshold voltage and having a second state when the voltage difference between the first end of the charger and the second end of the charger is less than the predetermined threshold voltage.

7. The charger device as recited in claim 6, wherein the controller is further configured to adjust a voltage at the first output in response to the enable signal having the first state.

8. A charger device comprising:
a Single-Input-Multiple-Output (SIMO) device including:
  a first transistor connected to an input and a first end of an inductor;
  a second transistor connected to ground and the first end of the inductor;
  a third transistor connected to a second end of the inductor and a first output; and
  a fourth transistor connected to the second end of the inductor and a second output;
a charger having a first end connected to the first output and a second end; and
a controller that is operatively connected to the SIMO device and configured to cause the SIMO device to power the inductor based upon an input signal provided by a first power source and discharge the inductor to power at least one of the first power source and a second power source via the charger during an unused time period,
wherein the second power source is connected to the input.

9. The charger device as recited in claim 8, wherein the first power source comprises a battery.

10. The charger device as recited in claim 8, further comprising:
  a first comparator configured to compare an input signal received from the first output to a first voltage reference signal and generate a first comparison signal based upon the comparison; and
  a second comparator configured to compare an input signal received from the second output to a second reference signal and generate a comparison second signal based upon the comparison.

11. The charger device as recited in claim 10, wherein the controller is further configured to cause the SIMO to selectively discharge the inductor to power the second power source based upon the first comparison signal.

12. The charger device as recited in claim 8, further comprising a headroom tracker having a first end connected to the first end of the charger and a second end connected to the second end of the charger, the headroom tracker configured to generate an enable signal having a first state when a voltage difference between the first end of the charger and the second end of the charger is greater than a predetermined threshold voltage and having a second state when the voltage difference between the first end of the charger and the second end of the charger is less than the predetermined threshold voltage.

13. The charger device as recited in claim 12, wherein the controller is further configured to adjust a voltage at the first output in response to the enable signal having the first state.

14. The charger device as recited in claim 8, wherein the charger comprises a linear charger.

15. A charger device comprising:
a Multiple-Input-Multiple-Output (MIMO) device including:
  a first transistor connected to a first input and a first end of an inductor;
  a second transistor connected to a second input and the first end of the inductor;
  a third transistor connected to ground and the first end of the inductor;
  a fourth transistor connected to a second end of the inductor and a first output; and
  a fifth transistor connected to the second end of the inductor and a second output; and
a controller that is operatively connected to the MIMO device and configured to cause the MIMO device (1) to charge the inductor based upon at least one of a first input signal provided by a first power source connected to the first input and a second input signal provided by a second power source connected to the second input and (2) to discharge the inductor to charge at least one of the first power source and a third power source coupled to the first output during an unused time period,
wherein the third power source is connected to the first input.

16. The charger device as recited in claim 15, further comprising the first power source and the second power source.

17. The charger device as recited in claim 15, further comprising a first comparator configured to compare an input signal received from the first output to a first voltage reference signal and generate a first comparison signal based upon the comparison; and a second comparator configured to compare an input signal received from the second output to a second reference voltage signal and generate a comparison signal based upon the comparison.

18. The charger device as recited in claim 17, wherein the controller is further configured to cause the MIMO to selectively discharge the inductor to power the third power source based upon the first comparison signal.

19. The charger device as recited in claim 15, further comprising:
  a charger having a first end connected to the first output and a second end connected to the second power source; and
  a headroom tracker having a first end connected to the first end of the charger and a second end connected to the second end of the charger, the headroom tracker configured to generate a headroom tracker signal when a voltage difference between the first end of the charger and the second end of the charger is greater than a predetermined threshold voltage.

20. The charger device as recited in claim 19, wherein the controller is further configured to adjust a voltage at the first output in response to the headroom tracker signal.

* * * * *